United States Patent [19]

Velepec

[11] Patent Number: 5,044,843
[45] Date of Patent: Sep. 3, 1991

[54] CUTTING TOOL

[75] Inventor: Fredric A. Velepec, Glendale, N.Y.

[73] Assignee: Fred M. Velepec Co., Inc., Glendale, N.Y.

[21] Appl. No.: 518,023

[22] Filed: May 2, 1990

[51] Int. Cl.⁵ .......................................... B26D 1/12
[52] U.S. Cl. ........................ 409/126; 144/134 D; 144/145 C; 407/53; 409/138; 409/178; 409/218
[58] Field of Search .......... 144/134 A, 134 R, 134 D, 144/145 C, 253 D, 144 R, 145 R, 144.5 R, 144.5 6 T; 407/34, 53, 54, 120; 409/138, 178, 182, 218, 110, 124, 126, 97; 384/58, 537, 585

[56] References Cited

U.S. PATENT DOCUMENTS

| 706,488 | 8/1902 | Crapp | 144/145 C |
|---|---|---|---|
| 947,079 | 1/1910 | Latcham | 144/145 C |
| 1,368,403 | 2/1921 | Knourek | 144/145 C |
| 1,615,893 | 2/1927 | Wagner | 144/145 X |
| 1,715,380 | 6/1929 | Onsrud | 144/144 R |
| 2,198,376 | 4/1940 | Cederberg | 384/903 X |
| 2,607,989 | 8/1952 | Peterson et al. | 409/126 X |
| 3,289,717 | 12/1966 | Dutot | 144/134 D |
| 3,504,952 | 4/1970 | Farmer | 384/58 X |
| 4,168,730 | 9/1979 | Keller | 144/326 R |
| 4,541,760 | 9/1985 | Zoueki | 409/137 |
| 4,669,923 | 6/1987 | McKinney | 144/145 C X |
| 4,733,997 | 3/1988 | Ford et al. | 409/84 |

FOREIGN PATENT DOCUMENTS

| 667422 | 11/1938 | Fed. Rep. of Germany | 384/585 |
|---|---|---|---|
| 617186 | 2/1961 | Italy | 144/144 R |
| 1201809 | 8/1970 | United Kingdom | 384/585 |

OTHER PUBLICATIONS

American Machinist, pp. 139, 140, 2/28/46.

*Primary Examiner*—Steven C. Bishop
*Attorney, Agent, or Firm*—Kenyon & Kenyon

[57] ABSTRACT

A carbide tipped cutting tool adapted to shape the edge surface of a counter top which opens about a sink or bowl mounted therebeneath. The cutting tool is provided with a plastic follower adapted to engage the side wall of the sink or bowl to facilitate cutting and shaping of the edge portion of the counter top. The plastic follower is formed of nylon or Delrin and captively holds a ball bearing member therein.

5 Claims, 1 Drawing Sheet

＃ CUTTING TOOL

BACKGROUND OF THE INVENTION

This invention relates to cutting tools generally and, in particular, to one suitable for shaping the edge surface of a counter top. The cutting tool of this invention is also useful for shaping the opening in a counter top having a sink or bowl mounted therebeneath.

Counter tops having a bowl or sink member mounted therebeneath are frequently formed as a single unit with the edge portion of the opening in the counter top having been molded or shaped at the factory. Numerous installations, however, require customized sizing and therefore need the top portion to be cut and shaped at the installation site. In these instances, it is necessary to form a rough opening shape and do the final cutting and shaping after the sink or bowl member has been mounted to the bottom side of the counter top.

Cutting and shaping tools suitable for on-site edging of counter tops, such as those fabricated of Corian, is accomplished with cutting tools which typically have a carbide tip cutting edge shaped to conform to the desired contour to be imparted on the counter top. In order to guide the shaping, the tool includes a plastic follower, usually fabricated from nylon or Delrin, which has its outer diameter shaped to match the side wall of the bowl or sink. Depending upon the slope of the surface with which the follower is to be engaged, there are instances in which the follower is generally straight or only slightly tapered. In any event, during the continuous cutting of such materials as Corian, it has been found that on occasion the plastic follower becomes dislodged from the cutting tool, because of heating of the various parts of the cutting tool member. A cutting and shaping tool which overcomes these drawbacks and retains the tool in operative form for cutting a large number of installations is described in the co-assigned U.S application Ser. No. 334,217 entitled "Cutting And Shaping Tool" which was filed on Apr. 6, 1989. While this cutting tool has been found highly advantageous, certain limitations exist, particularly when cutting or shaping a bowl or sink which prevents full insertion of the cutting tool and follower. It is particularly for such installations which the cutting and shaping tool of this invention is particularly advantageous.

SUMMARY OF THE INVENTION

In the preferred embodiment, a cutting tool suitable for shaping the top counter section mounted to a fixture member therebeneath is provided with a plastic follower, preferably formed of nylon or Delrin, which retains its position during cutting and shaping of a number of installations. The cutting tool includes a shaft member with a shaped cutting edge to implement the desired shape to the edge of the counter. The lower end of the cutting tool has extending therefrom a smaller diameter bearing shaft for mounting of a captively held ball bearing in a follower means, the latter of which has its outer diameter substantially contoured to the shape of the fixture side wall so that it remains in engagement therewith during the cutting and shaping of the open edge of the counter section. The follower means is prevented from becoming dislodged from the shaft member during operation and is formed of a first and second section which, when mated, captively hold the ball bearing means therein. Each section of the follower means is recessed to hold the ball bearing means therein. Further, the sections are adapted to be snap fastened to one another. A fastener, such as a screw member, is used for securing the follower means and captively held bearing means to the shaft member.

The cutting tool is preferably provided with a follower means in the form of a nylon circular follower which has a tapered outer diameter contoured to the shape of the inside section of the sink or bowl member. Other shapes or materials may of course be used, including straight shapes and materials such as Delrin.

It is also preferred to provide the cutting tool follower means with a recess at is lower end portion to allow the head of the screw fastening member to be disposed therein and allow the follower means to penetrate into the sink or bowl being shaped.

Accordingly, it is an object of this invention to provide a cutting tool suitable for shaping counter tops wherein the follower means is mounted to the cutting tool to allow cutting and shaping of a series of installations.

It is another object of this invention to provide a cutting tool having a plastic follower which is particularly adapted to be used in shaping sinks or bowls wherein a ledge or other interference which limits the amount of tool insertion.

These and other objects of the invention shall become more apparent from the following description of the invention, taken in conjunction with the drawings.

DESCRIPTION OF THE PREFERRED EMBODIMENT

Figure 1:
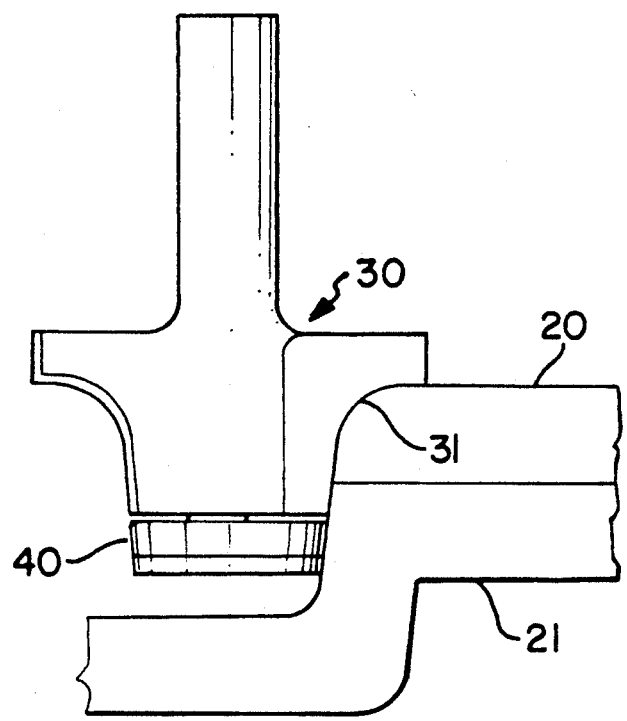
FIG. 1 is an elevation view of the cutting tool of this invention depicted shaping the cut out edge of a counter top.
Figure 2:
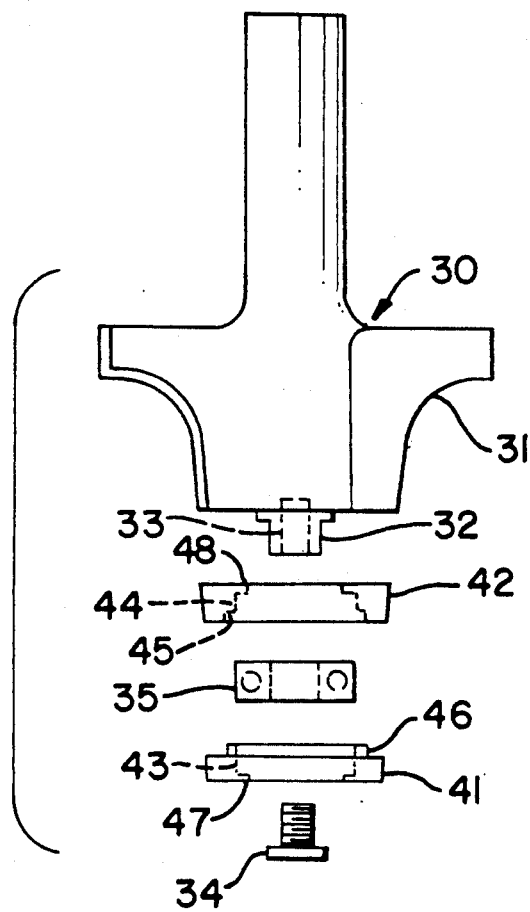
FIG. 2 is an elevation view of the cutting tool of this invention.

With reference to the drawings and in particular, FIG. 1, the cutting tool 30 is depicted having a shaped carbide tip cutting edge 31. The cutting edge 31 is shaped to provide the desired contour to the inside open section of the counter top 20. Of course, cutting tool 30 may be used in cutting and shaping the outer edge of counter top 20. Cutting tool 30 includes a split plastic follower 40 which is tapered on its outside diameter. In order to provide the desired shape to the cut out section, the plastic follower 40 of cutting tool 30 is placed into engagement with the side wall section of the sink or bowl member 21. In this manner, cutting of the counter top 20 progresses along the periphery of the cut out section until the desired shape is achieved with plastic follower 40 guiding the cutting because of its engagement with the side wall of sink or bowl 21. In those instances where cutting tool 30 is used to shape the outer edge of a counter top, plastic follower 40 may be provided with a straight shape and engage a straight wall of a fixture disposed below the counter top.

Cutting tool 30 includes a smaller diameter shaft section 32 protruding beneath the carbide tipped cutting edge 31. Shaft section 32 includes a receptacle 33 for receiving a screw type fastener 34. A ball bearing member 35 is rotatably mounted to shaft section 32. The inner race of ball bearing 35 is in turn mounted within a plastic follower 40, the latter of which rotates with the outer race of ball bearing 35. Thus, bearing 35 and split plastic follower 40 rotate about shaft section 32.

Plastic follower 40, which is preferably fabricated from nylon or Delrin, is provided in two sections 41 and 42 which are adapted to be snap fastened together and captively house ball bearing 35. Each section 41 and 42 has a recess 43 and 44, respectively, to hold ball bearing 35. Section 42 includes a recess 45 into which a mating boss 46 on section 41 fits. A snap fit is preferred with permanent fastening being achieved by a suitable cement bonding agent such as CA4OH manufactured by 3-M Company. Alternatively, sections 41 and 42 may be permanently fastened by ultrasonic sound. Each section 41 and 42 includes an outer flange at 47 and 48, respectively, which retain ball bearing 35 within the follower 40.

The various components of the cutting tool 30 are assembled by means of a screw type fastener 34. Screw fastener 34 mounts to the threaded receptacle in the shaft portion 32 of tool 30. Thus, fastener 34 holds in place split plastic follower 40 and ball bearing 35. The cutting tool of this invention has been found to retain plastic follower 40 in the appropriate position while cutting and shaping a series of installations. The follower is maintained in position despite heating of the cutting tool such as is caused working with materials such as Corian.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A cutting tool suitable for shaping the top of a counter section having a fixture disposed therebeneath, the cutting tool comprising a shaft member having a shaped cutting means disposed at the lower end thereof for shaping the counter section, said shaft member including a smaller diameter shaft extending from the lower end of said shaped cutting means with a receptacle means included therein suitable for receiving a fastening means, a ball bearing means adapted to be rotatably mounted on said smaller diameter shaft, a split follower means adapted to captively hold said ball bearing means, including a first and second section, the outer diameter thereof shaped to bear against the side wall of the fixture, said first section including a recess for mounting said ball bearing means, an outer diameter for bearing against the fixture being shaped and a cylindrical boss section having a diameter smaller than said outer diameter suitable for engaging a recess in said second section, said second section including a first recess therein for holding said ball bearing means and a second recess adapted to mate with said boss means of said first section to form a closed follower means captively holding said ball bearing means therein, and a fastening means engageable with said receptacle means to facilitate screw fastening of said follower means including said ball bearing means therein to said shaft member.

2. A cutting tool in accordance with claim 1 wherein said follower means is made of Delrin or nylon.

3. A cutting tool in accordance with claim 1 wherein said first and second sections are snapped together and fastened with a cement bonding agent.

4. A cutting tool in accordance with claim 1 wherein said first and second sections are permanently fastened together with ultrasonic sound.

5. A cutting tool in accordance with claim 3 wherein said first and second sections have flange means at the exposed surfaces therefor for captively holding said ball bearing means therein.

* * * * *